Sept. 6, 1927.  
H. M. STOLLER  
1,641,359  
DYNAMO ELECTRIC MACHINE  
Filed May 31, 1922  
2 Sheets-Sheet 1
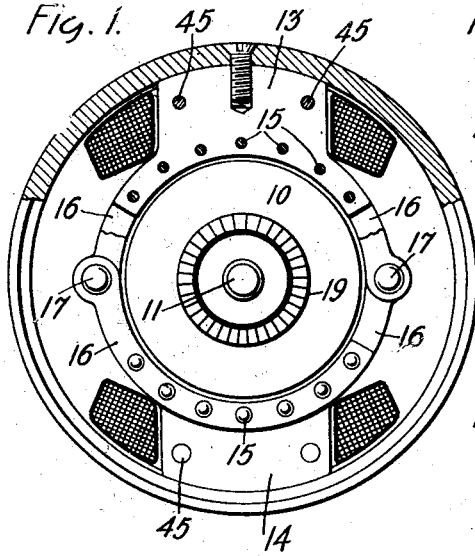
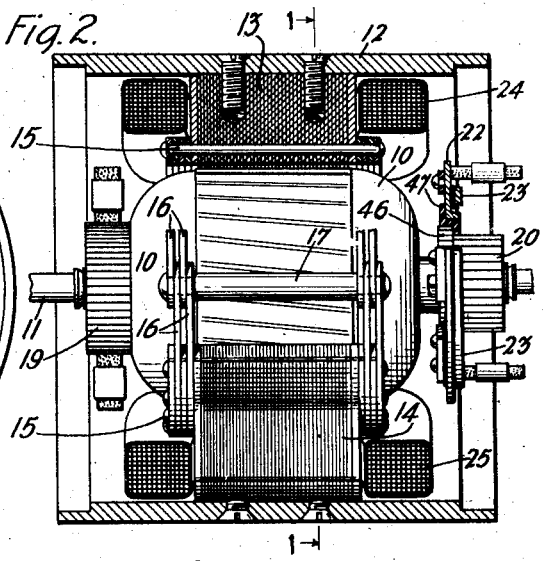
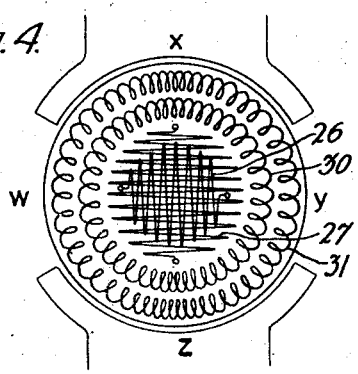
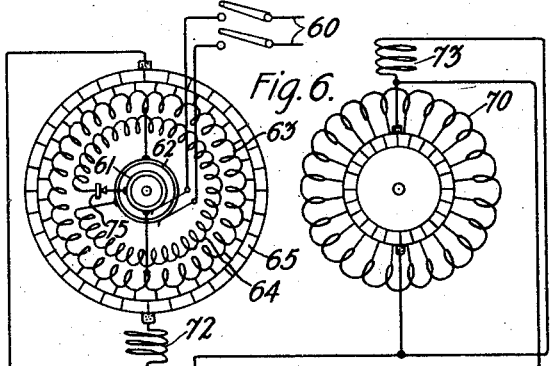
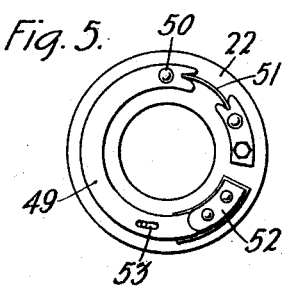
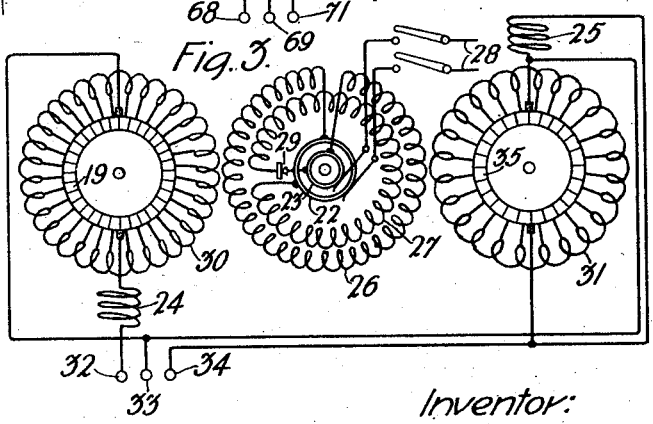
Inventor:
Hugh M. Stoller
by Joel C. L. Palmer
Atty.

Sept. 6, 1927.

H. M. STOLLER 1,641,359

DYNAMO ELECTRIC MACHINE

Filed May 31, 1922  2 Sheets-Sheet 2

Inventor:
Hugh M. Stoller
by Joel C.R. Palmer
Att.

Patented Sept. 6, 1927.

1,641,359

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

DYNAMO-ELECTRIC MACHINE.

Application filed May 31, 1922. Serial No. 564,680.

This invention relates to dynamo electric machines and particularly to rotary converters.

One object of this invention is to provide a cheap and efficient means for obtaining small quantities of direct current power from a single phase alternating current source.

Another object of this invention is to provide a single phase rotary converter which, if desired, may be self-starting.

Another object of this invention is to provide a dynamo electric machine excited substantially entirely by armature reaction for supplying a substantially constant direct current output.

Another object is to prevent hunting in a dynamo electric machine.

Another object is to provide means for obtaining a substantially constant output from a single phase rotary converter.

Another object is to provide means for insuring that a synchronous dynamo electric machine will pull into synchronism always with the same polarity at its poles, whereby the positive and negative terminals of the machine will not vary.

Another object is to provide a rotary converter which will always supply direct current of the same polarity and which has its direct current windings entirely disconnected from its alternating current winding or windings.

A dynamo electric machine with which the above objects are attained is particularly suitable for use with thermionic vacuum tubes and the like for supplying the necessary anode-cathode space current and for heating the filamentary cathode.

One embodiment of this invention, as hereinafter described in detail, comprises a single phase rotary converter having its field excited substantially entirely by armature reaction. The armature which may be drum wound, is provided with a motor winding adapted to be connected to a source of alternating current, and one or more generator windings depending upon the number of direct current voltages it may be desired to obtain from the machine. A substantially constant current output is insured by providing amortisseur windings imbedded in the pole pieces, and by tapering the generator winding around the drum so that at any instant the number of active conductors is inversely proportional to the strength of the field. The provision of the amortisseur windings suppresses the hunting action which tends to occur in a synchronous motor. In order that the machine may be self-starting an additional motor winding may be provided wound at right angles to the first motor winding, whereby the machine may start as a split phase induction motor and this second motor winding, after the machine has been started, may be automatically disconnected by any suitable means.

When the motor has been speeded up into synchronism it is frequently desirable to have it pull into synchronism always with the same polarity of its generator windings, as when used for energizing thermionic tubes, which will conduct current only from the plate to the filament. In accordance with one form of this invention this is accomplished by connecting across the direct current brushes of the machine, an opposing shunt field winding and an aiding series winding. After the machine has pulled into synchronism the field windings neutralize each other, thereby giving zero ampere turns so as to have substantially no effect upon the magnetization of the field of the machine, once the machine has been started and pulled into synchronism. The machine is prevented from pulling into synchronism in the wrong direction by the weakening of the flux, due to the opposing shunt winding.

Referring to the drawings,

Fig. 1 is a fragmentary cross-sectional view of the machine, partial in elevation, taken on the line 1—1 of Fig. 2;

Fig. 2 is a cross-section, partial elevation, taken in a plane perpendicular to Fig. 1;

Fig. 3 is a schematic diagram showing the armature windings and the circuit connections for one form of this invention;

Fig. 4 illustrates the manner in which the armature windings are placed upon the drum;

Fig. 5 illustrates a centrifugally controlled contact utilized in the present invention;

Fig. 6 is a schematic diagram of the armature windings and circuits for a second form of the machine of this invention;

Figure 7:
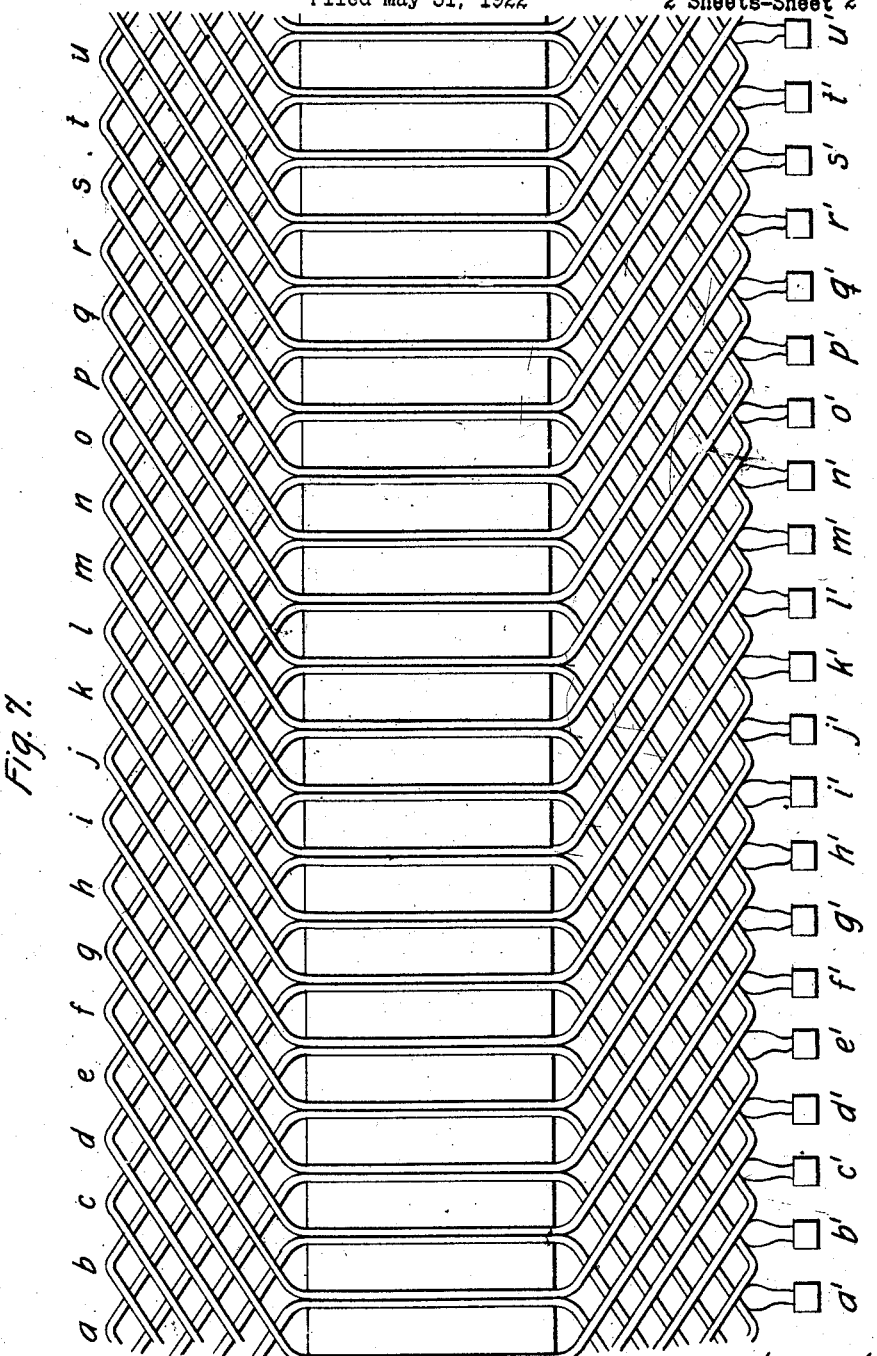
Fig. 7 is a development showing a method of winding the armature.

Referring to Figs. 1 and 2, the rotary converter illustrated therein comprises a drum wound armature 10, mounted on a shaft 11 and surrounded by a tubular field structure 12 having salient pole pieces 13 and 14. A squirrel cage winding or amortisseur winding for the field poles 13 and 14 is provided by a plurality of copper bars 15, imbedded in each pole piece and extending in a direction parallel to the shaft 11. On each side of the pole pieces 13 and 14 these bars 15 are joined by copper strips 16 forming rings surrounding the armature in a plane at right angles to the shaft 11. These rings are joined at 90° from the pole pieces by copper bolts 17. This arrangement, therefore, forms short-circuited amortisseur windings imbedded in the face of each field pole.

Two separate commutators 19 and 20 are mounted on opposite ends of the shaft 11 suitably connected by wires (not shown) to two generator windings of the armature. Brushes bearing on the two commutators may be employed to lead off therefrom into independent circuits, direct current voltages of strengths determined by the generator winding to which they are connected. The motor windings of the armature are supplied with alternating current through slip rings 22 and 23 also mounted on shaft 11. If it is desired that the rotary converter should pull into synchronism with its direct current brushes always poled the same way, auxiliary field windings 24 and 25 may be provided to function in a manner hereinafter described in detail.

Fig. 3 shows schematically the connections between the various armature windings and the input and output leads of the machine. Two motor windings 26 and 27 are provided for starting the rotary converter as a split-phase induction motor. Motor winding 26 is connected through the intermediary of slip rings 22 and 23 to supply leads 28 which may be connected to a source of single phase alternating current. Winding 27 is also connected to supply leads through the slip rings, but a centrifugally controlled contact 29 is included in circuit with winding 27 to disconnect winding 27 from the supply leads, after the motor is started. The armature 10 also has two independent generator windings 30 and 31 wound in a particular manner hereinafter described. Winding 30 is connected to commutator 19 and through the series aiding field winding 24 to output terminals 32 and 33. Similarly winding 31 is connected through commutator 35 and through shunt differential field winding 25 to output terminals 33 and 34. Terminal 33 thus may be employed as the common negative terminal for the two generator windings and terminals 32 and 34 for the independent positive terminals of the two generator windings.

The actual manner in which the windings 26, 27, 30 and 31 are placed on the armature is shown in Fig. 4. The motor windings 26 and 27 are essentially mono-axial windings having their two axes at right angles to each other. The generator windings 30 and 31 for convenience, are shown in Fig. 4 as well as in the other figures as ring wound windings, although actually they are short-pitched drum wound windings, superposed on each other in the same slots of the drum. The same slots are utilized also, of course, to receive the two motor windings 26 and 27.

The angular relation of windings 26 and 27 with respect to the windings 30 and 31, varies under operating conditions and must, in every case, be such that the field flux, which winding 26 sets up for example, will be a minimum when the number of active turns in windings 30 and 31 is a maximum. The magnitude of this angular relation depends upon the power factor of the current drawn by winding 26 and varies with different designs of machines. If winding 26 draws current of very high power factor, its preferable position is such that the direction of its magneto-motive force is approximately perpendicular to the $x$—$z$ axis of windings 30 and 31, shown in Fig. 4. On the other hand, if winding 26 draws current of very low power factor, it is preferably so placed that its magneto-motive force is in a direction at a suitable angle with respect to the $x$—$z$ axis.

The manner in which the machine operates will now be described. When it is desired to start the machine, a suitable source of single phase alternating current is connected to supply leads 28. Since the two motor windings 26 and 27 are connected in parallel with respect to the supply leads and are wound at right angles to each other on the armature drum, the armature starts rotating as in a split-phase induction motor, due to the starting torque produced by the angular relation of the two motor windings. As soon as moderate speed has been reached the centrifugally controlled contact 29 will operate to disconnect winding 27 from the supply leads 28 and the motor will continue operating as a single phase induction motor. The machine thereafter pulls into synchronism with the frequency of the alternating current source and operates as a synchronous motor in which the field is excited by armature reaction from winding 26. The magnetic effect of the armature reaction may be explained as follows: In a converter of the ordinary type, if the current is in phase with the voltage, the armature reaction will develop merely a cross-magnetization effect, as in a D. C. motor. If the field excitation of the converter is increased, the machine will draw a leading current which will have a demagnetizing effect such that the resultant flux is the same as in the previous case. If the field of the converter is weakened below normal, the machine will draw a lagging magnetizing current such that the armature reaction produces a magnetizing effect, bringing the flux up to normal value. In the case of this invention, the resultant field excitation is zero or substantially zero, so that the excitation is supplied by lagging current from the armature winding. The polarity of the pole pieces 13 and 14 now being fixed, the direct current may be drawn from terminals 32 and 33 and terminals 33 and 34 connected as previously described, to the respective generator windings 30 and 31. Winding 30 is preferably designed so that the voltage delivered to terminals 32 and 33 is suitable for the anode-cathode voltage of a vacuum tube, while winding 31 is preferably designed so that the voltage delivered to terminals 33 and 34 is suitable for heating the filament of a vacuum tube.

It is obvious that unless precautions are taken the machine might pull into synchronism so that either pole 13 or pole 14 would become the north pole, and hence, terminal 32 might on one starting be positive and on another starting, negative. In order to insure that the machine will pull into synchronism so that pole 13 will always be the positive pole, for example, and pole 14 always negative, auxiliary windings 24 and 25 are provided by this invention; winding 24 surrounding pole piece 13 and being connected as an aiding winding in series with the high voltage generator winding 30, and auxiliary field winding 25 surrounding pole 14 and being connected as an opposing or differential winding in shunt to the generator winding 31.

The result of employing a shunt field opposing the magnetization of the machine and the series field aiding the magnetization of the machine, results in invariably building up the machine in the proper direction even over wide voltage ranges from the supply leads 28. For example, it has been found to be a reliable way of building up the machine for a voltage from 97 to 126 volts.

Special means have been applied to these machines in accordance with this invention whereby a substantially constant direct current output may be obtained from both generator windings 30 and 31. The amortisseur windings comprising the copper bars 15, 17 and strips 16 have been found to substantially prevent the hunting oscillations such as are usually encountered in synchronous motors. As the speed of the armature 10 tends to increase or decrease torque exerted on the armature by the field magnet increases or decreases. This increase or decrease in torque is accompanied by a shifting of the magnetic flux backward and forward over the faces of the poles 13 and 14 and this shifting flux introduces current in the short-circuited bars 15 of the amortisseur winding producing therein currents which oppose the shifting of the flux so that the tendency to hunt is substantially dampened, or neutralized.

Since the embodiment in this invention herein described, is adapted to be supplied from a single phase alternating current source, field flux tends to pulsate somewhat at a frequency double that of the source as is well understood in the art. In accordance with this invention, objectionable ripples, which tend to be produced thereby in the direct current output of the converter, are prevented by distributing the direct current windings, as shown schematically in Fig. 4. In this figure windings 30 and 31 are shown distributed so that the number of conductors per unit of armature periphery increases progressively from W to X and Y to Z and decreases progressively from X to Y and Z to W. The distribution is such that the number of active conductors in each slot of the armature at each instant during the rotation of the armature is as nearly as possible inversely proportional to the instantaneous strength of the field, and hence, the voltage introduced in windings 30 and 31 is substantially constant at all times and is substantially independent of the instantaneous strength of the current from the alternating current source applied. Another way of stating the desired distribution of the armature windings 30 and 31 in the slots, is that at all times the product of the active conductors and the field flux should be equal to a constant.

Due to the fact that hunting is eliminated and the armature direct current windings are tapered in the manner above described, the direct current output obtained by the machine in this invention is substantially constant.

As previously described windings 24 and 25 are provided for the purpose of insuring that the machine will pull into synchronism always in the same direction. Obviously, these windings are unnecessary and may be omitted in cases where it is desired to use the machine for such purposes that it is immaterial which pole of the machine is positive or negative. Even when the windings 24 and 25 are present, they preferably are designed such that when the machine has reached its normal speed and has pulled into synchronism the flux produced by winding 24 will be approximately neutralized by the flux produced by winding 25 so that no magnetization of the field is produced by these two windings after the machine has pulled into synchronism. This condition is desirable because it requires the minimum amount of field coil space necessary to enable the machine to operate over the usual range of applied primary voltage, i. e. from 100 to 120 volts.

The two windings 24 and 25 of Fig. 3 which serve for pulling the machine into synchronism always with the same polarity may be replaced by other arrangements which readily suggest themselves to those skilled in the art.

The pole pieces 14 and 13 are shown to be composed of laminated iron strips suitably fastened together by bolts 45. If desired, the laminations may be made of hardened steel or other material having high magnetic remanence, such as tungsten steel or manganese steel. When the pole pieces are of such material as tungsten steel or manganese steel they may be magnetized somewhat by applying direct current when the machine is first assembled. The permanent magnetism of the laminations aids in obtaining always the same polarity after the machine has started. In case the auxiliary field windings 24 and 25 are provided, it is generally preferable, however, that the laminations of the pole pieces be made of soft iron having low magnetic remanence, since by using the two auxiliary windings 24 and 25 the use of permanent magnetism in the pole pieces becomes unnecessary to provide other means to insure always the same polarity on pulling into synchronism.

The general features of the design of the machine of Figs. 1 and 2, such as pole arc, air gap, and other structural features, should be in accordance with the standard practices used in the design of small motors or generators. In one embodiment of this invention, the field tubing had an external diameter of five inches, the armature was three inches in diameter, and the field poles were two inches long in the direction of the shaft of the machine. The shunt field 25 consisted of 700 turns of No. 30 B. & S. wire, while field 24 consisted of 7000 turns of No. 35 B. & S. wire. In general the ampere turns of both fields 24 and 25 should be about one-fourth the resultant ampere turns of the motor winding of the machine. With the generator windings arranged as hereinafter described, the high voltage winding gave 145 volts at 20–30 milliamperes, while the low voltage winding gave 20 volts at 1½ amperes. The values given above are merely illustrative of one form of this invention, but it is obvious that for different requirements the values given would not necessarily hold.

If desired, commutator 20 and slip rings 22 and 23 may be made as a unitary structure, as shown in Fig. 2. Commutator 20 has a hub 46 adjacent to armature 10 and mounted on this hub is a ring 47 of insulating material, slip ring 22 being forced into the seat of ring 47 and insulated thereby from commutator 20. The second slip ring 23 is insulatingly mounted on slip ring 22 in a suitable manner. If desired, the centrifugally controlled contact 29 of Fig. 3, used to disconnect winding 27 under certain conditions, may be mounted on that side of slip ring 22 adjacent to the armature. As shown in Fig. 5, the centrifugally controlled contact comprises a circular contact member 49, pivoted at 50 and under tension from spring 51, the spring 51 maintaining the movable member 49 in contact with the stationary contact member 52. When the machine is at rest, contact is made between members 49 and 52, but as soon as the machine has reached a moderate speed (about ⅔ of synchronous speed), the contact member 49, due to centrifugal force is pulled away from contact 52, an amount determined by the length of slot 53, which cooperates with the stud on the slip ring 22.

It should be noted that the alternating current windings 26 and 27 are insulated from the direct current windings 30 and 31. This advantage is obtained thereby that either side of the supply leads 28 may be grounded without grounding at the same time the lead conductors connected to terminals 32, 33, or 34.

The development of Fig. 7 shows the distribution of coils and commutator connections for either winding 30 or winding 31. The armature shown in this development contains twenty-one slots and each winding consists of twenty-one coils, $a$, $b$, $c$, $d$, $e$, $f$, $g$, $h$, $i$, $j$, $k$, $l$, $m$, $n$, $o$, $p$, $q$, $r$, $s$, $t$, and $u$ connected to twenty-one commutator segments $a'$, $b'$, $c'$, $d'$, $e'$, $f'$, $g'$, $h'$, $i'$, $j'$, $k'$, $l'$, $m'$, $n'$, $o'$, $p'$, $q'$, $r'$, $s'$, $t'$, and $u'$. The distributing of the coils is the same as in the well-known type of drum winding, but the number of turns per coil is graduated to produce the effect shown schematically in Fig. 4. The following tables show a satisfactory arrangement of turns for one design of the machine.

Table 1.

| Coil on high voltage winding | Number of turns in coil | Coil on high voltage winding | Number of turns in coil |
|---|---|---|---|
| a | 90 | l | 90 |
| b | 85 | m | 85 |
| c | 80 | n | 80 |
| d | 75 | o | 75 |
| e | 70 | p | 70 |
| f | 65 | q | 65 |
| g | 70 | r | 70 |
| h | 75 | s | 75 |
| i | 80 | t | 80 |
| j | 85 | u | 85 |
| k | 90 | | |

Table 2.

| Coil of low voltage winding | Number of turns in coil | Coil of low voltage winding | Number of turns in coil |
|---|---|---|---|
| a | 17 | l | 18 |
| b | 18 | m | 17 |
| c | 17 | n | 17 |
| d | 16 | o | 16 |
| e | 15 | p | 15 |
| f | 14 | q | 14 |
| g | 13 | r | 13 |
| h | 14 | s | 14 |
| i | 15 | t | 15 |
| j | 16 | u | 16 |
| k | 17 | | |

If there is little magnetic leakage between high voltage winding 30 and low voltage winding 31, each coil of the low voltage winding contains a certain fraction of the number of turns in the corresponding coil of the high voltage winding. However, if there is much leakage between these two windings, it is preferable to shift the $w—y$ axis of winding 31 (see Fig. 4) with respect to the $w—y$ axis of winding 30 so as to maintain the condition that each winding has the greatest number of turns active when the flux it is cutting is the weakest. An example of such a shift is shown by Table 2 in which each coil lies in the same slots as the similarly designated coil in Table 1.

The form of this invention illustrated in Fig. 6 differs from the form in Figs. 3 and 4 in that one of the motor windings is also used as a generator winding, whereby one of the windings 26 and 27 of Fig. 3 may be dispensed with. In Fig. 6 the supply leads 60 from an alternating current source lead through slip rings 61 and 62 to windings 63 and 64. These two windings serve as motor windings for the converter whereby the machine starts up as previously described as a split-phase induction motor. As soon as the machine has reached a moderate speed the centrifugally controlled contact 75 serves to disconnect winding 64 in the same manner as one of the windings of Fig. 3. The machine then continues to operate as a synchronous motor. Winding 63 is connected to a commutator 65 whereby direct current generated by winding 63 may be led off therefrom. Winding 63 may, therefore, be utilized to supply the high voltage for a vacuum tube amplifier connected to terminals 68 and 69 in the same manner as the winding 30 of Fig. 3. The low voltage winding 70 is similar in its functions and distribution to winding 31 to Fig. 3 and no further description thereof is believed necessary. Winding 70 is connected between output terminals 69 and 71 whereby a low voltage direct current output may be obtained therefrom. In order that the machine will pull into synchronism always with the same polarity, the auxiliary series aiding winding 72 and the auxiliary shunt opposing winding 73 may be utilized as above described, the two auxiliary windings, however, being designed to neutralize each other when the machine has reached its normal speed. The armature winding arrangement of Fig. 6 operates in a similar manner as the winding arrangement of Fig. 3 with the exception that one less winding is required.

It is to be understood that this invention is not limited to the form and specific arrangement above described since it will be obvious to those skilled in the art that many modifications may be made without departing from the spirit of this invention, as defined in the appended claims. For example, the machine could be partially excited by direct current field windings connected to one set of generator brushes, thereby improving the power factor of the machine.

It may also be pointed out that one advantage obtained by operating the machine by armature reaction excitation is that the machine may be operated with a low power factor, $\frac{3}{10}$ for example, which has been found to aid materially in the elimination of hunting, since difficulty is frequently experienced in eliminating hunting by amortisseur windings alone in a machine operated near unity power factor, particularly for a small machine.

It should also be pointed out that if the polarity of the machine is of no consequence, the field windings 24 and 25 may be replaced by thick copper rings, the function of which will be to pull the machine into synchronism, but not necessarily always with the same polarity.

The invention claimed is:

1. A dynamo electric machine comprising an armature, a winding on said armature, slip rings connected to said winding, a second winding upon said armature, some of the coils of said second winding having more turns than other of the coils of said second winding, and a field structure adapted to be excited substantially entirely by said first-mentioned winding.

2. A dynamo electric machine comprising a slotted armature, a winding on said armature, said winding being so distributed that certain successive slots contain an increasing number of conductors per slot and certain other successive slots contain a decreasing number of conductors per slot, and a field structure adapted to be excited substantially entirely by armature reaction.

3. An $n$-pole dynamo electric machine comprising a slotted armature considered as divided into $2^n$ zones, each zone containing approximately $\frac{1}{2^n}$ of the entire number of slots, a winding on said armature, said winding being so distributed that in alternate zones the successive slots contain an increasing number of conductors per slot and in the intermediate zones a decreasing number of conductors per slot, and a field structure adapted to be excited substantially entirely by armature reaction.

4. A dynamo electric machine comprising an armature, a winding on said armature, slip rings connected to said winding, a second winding on said armature, some of the coils of said second winding having more turns than other of the coils of said second winding a commutator connected to said second winding for leading direct current therefrom and a field structure for said machine excited substantially entirely by armature reaction.

5. A dynamo electric machine comprising a slotted armature, a winding on said armature, said winding being so distributed that certain successive slots contain an increasing number of conductors per slot, certain other successive slots contain a decreasing number of conductors per slot, a commutator connected to said winding for leading direct current therefrom and a field structure for said machine excited substantially entirely by armature reaction.

6. An $n$-pole dynamo electric machine comprising a slotted armature divided into $2^n$ zones, each zone containing approximately $\frac{1}{2^n}$ of the entire number of slots, a winding on said armature, said winding being so distributed that in alternate zones the successive slots contain an increasing number of conductors per slot and the intermediate zones a decreasing number of conductors per slot a commutator connected to said winding for leading direct current therefrom, and a field structure for said machine excited substantially entirely by armature reaction.

7. A dynamo electric machine comprising an armature, a tapered winding on said armature, a commutator for leading off direct current from said winding, and a field structure adapted to be excited substantially entirely by armature reaction.

8. A dynamo electric machine comprising a rotating armature, means for producing a field flux, a winding on said armature, the conductors of said winding being so distributed that during the rotation of the armature the number of active conductors at any instant varies substantially inversely as the strength of the field flux linking therewith and a commutator connected to said winding for leading direct current therefrom.

9. A synchronous dynamo electric machine comprising an armature, a winding on said armature, slip rings connected to said winding, a field structure for said machine, a series aiding field winding and a shunt opposing field winding, said shunt winding being adapted to prevent the establishment of a field flux when said shunt winding alone is excited.

In witness whereof, I hereunto subscribe my name this 29th day of May, A. D. 1922.

HUGH M. STOLLER.